United States Patent
Nehse et al.

(10) Patent No.: US 11,704,062 B2
(45) Date of Patent: Jul. 18, 2023

(54) METHOD FOR PROCESSING INPUT/OUTPUT (I/O) REQUESTS OF A RAID SYSTEM HAVING A PROTECTION POOL OF STORAGE UNITS

(71) Applicant: EMC IP Holding Company LLC, Hopkinton, MA (US)

(72) Inventors: Paul Nehse, Livermore, CA (US); Michael Thiels, San Martin, CA (US); Devendra Kulkarni, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/314,805

(22) Filed: May 7, 2021

(65) Prior Publication Data

US 2022/0357883 A1    Nov. 10, 2022

(51) Int. Cl.
*G06F 3/06* (2006.01)

(52) U.S. Cl.
CPC .......... *G06F 3/0659* (2013.01); *G06F 3/0611* (2013.01); *G06F 3/0656* (2013.01); *G06F 3/0689* (2013.01)

(58) Field of Classification Search
CPC .... G06F 3/0659; G06F 3/0611; G06F 3/0656; G06F 3/0689
See application file for complete search history.

(56) References Cited

U.S. PATENT DOCUMENTS

| 8,661,218 B1* | 2/2014 | Piszczek | G06F 11/108 714/6.24 |
| 10,417,094 B1* | 9/2019 | Levy | G06F 11/1004 |
| 2013/0019062 A1* | 1/2013 | Bennett | G06F 3/0659 711/E12.019 |

\* cited by examiner

*Primary Examiner* — Kalpit Parikh
(74) *Attorney, Agent, or Firm* — Womble Bond Dickinson (US) LLP

(57) ABSTRACT

A method, apparatus, and system for processing Redundant Array of Independent Disks (RAID) Input/Output (I/O) requests for a plurality of nodes in a cluster is disclosed. A file system request including a byte offset is received. Then, a Physical Extent (PE) row that matches the file system request and a RAID stripe within the identified PE row based on the byte offset is identified. Next, a plurality of RAID I/O requests to be routed to a physical disk is generated. Each of the plurality of the RAID I/O requests includes information associated with the PE and a type of operation. Thereafter, each of the RAID I/O requests is processed based on the information associated with the PE and the type of operation.

20 Claims, 11 Drawing Sheets

METHOD FOR PROCESSING INPUT/OUTPUT (I/O) REQUESTS OF A RAID SYSTEM HAVING A PROTECTION POOL OF STORAGE UNITS

FIELD OF THE INVENTION

Embodiments of the present invention relate generally to storage applications. More particularly, embodiments of the invention relate to method for processing Input/Output (I/O) requests of a Redundant Array of Independent Disks (RAID) system having a protection pool of storage units.

BACKGROUND

Customers are increasingly adopting different technologies for data storage. Both appliances and software only packages that can be deployed in a hypervisor environment are desired. The scale up architecture needs to be extensible to be deployed in both physical and virtual environments.

Currently, Data Domain (DD) uses a scale up architecture which may require very large and complex disk farms to meet customer capacity and performance requirements. Protection pool architecture, for example, allows linear scaling of performance and capacity by adding storage nodes. From its inception, DD has been focused on single node appliances.

However, Data Domain (DD) RAID I/O requests from a file system are performed through an array directly to local disks. In a cluster having a collection of nodes, a method and system are needed to send I/O requests to any node in the cluster.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
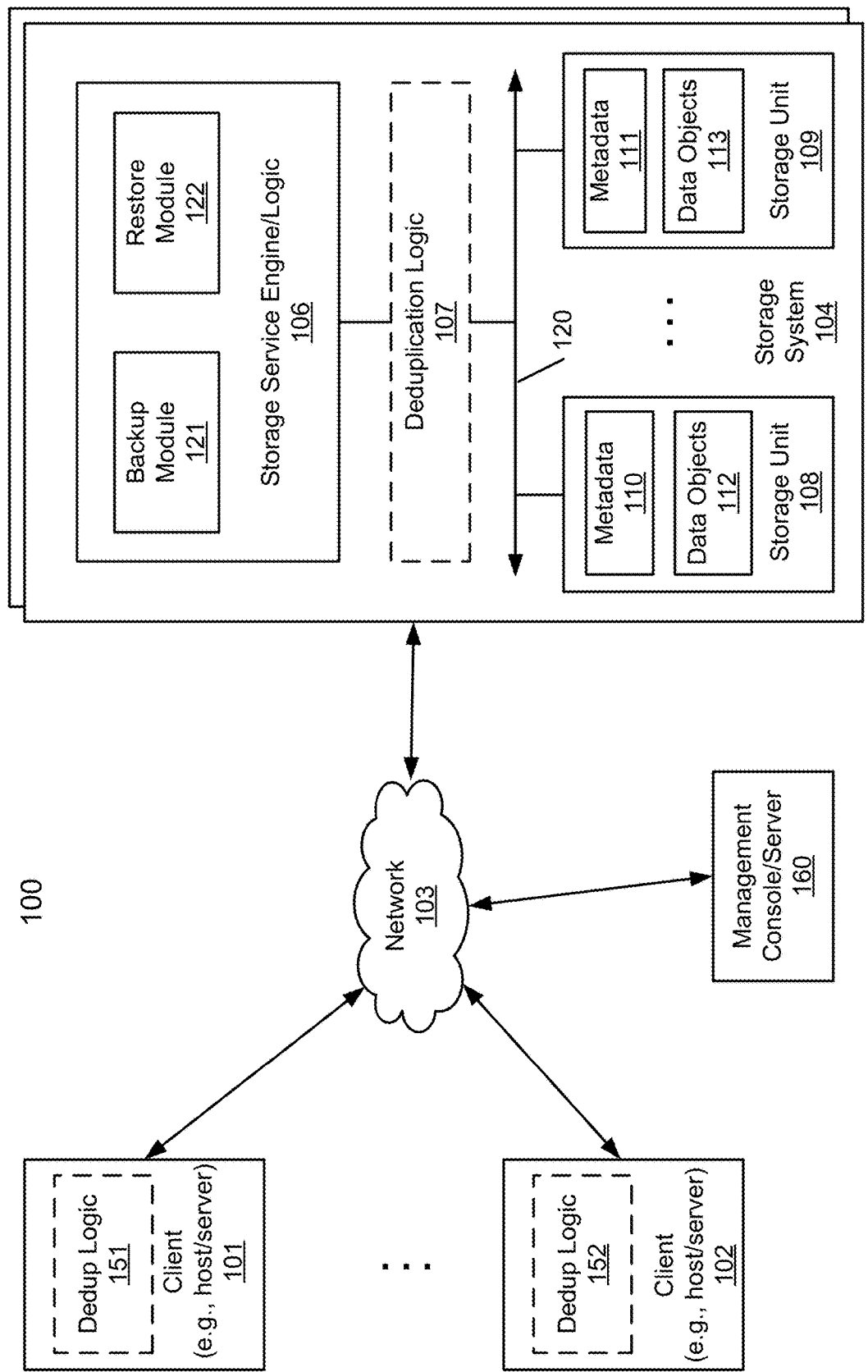
FIG. 1 is a block diagram illustrating an example environment in which embodiments of the disclosure may be practiced.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

An Array Group (AGRP) can be created on any node in a cluster and can migrate to any node in the cluster but can only be assembled on one node at a time. The AGRP may have a unique ID that upper level processes can use to identify and manage the AGRP and its arrays. The cluster uses a shared protection pool that may allow any node in the cluster to access any part of a data storage. In this manner, a collection of partitions can dynamically grow and shrink (when supported by Data Domain File System (DDFS)). In addition, when a node in the cluster fails, the collection of partitions can be migrated to another node so the access to its storage can be maintained. The protection pool also can provide a protected storage that is resilient against at least dual disk and/or single node failures. Changing arrays from directly accessing physical disks to virtual disks may provide a flexibility to where the data reside. Each virtual disk may include a list of Physical Extents (PEs) that indicate the actual data location. The location of the PE can be anywhere within a cluster.

Embodiments of the disclosure relate to a method, apparatus, and system for processing Redundant Array of Independent Disks (RAID) Input/Output (I/O) requests for a plurality of nodes in a cluster. According to some embodiments, Protection Pool driver receives a file system request including a byte offset. Protection Pool driver identifies a Physical Extent (PE) row that matches the file system request and a RAID stripe within the identified PE row based on the byte offset. Array map generates a plurality of RAID I/O requests to be routed to a physical disk. Each of the plurality of the RAID I/O requests includes information associated with the PE and a type of operation. Protection pool driver processes each of the RAID I/O requests based on the information associated with the PE and the type of operation.

In one embodiment, the information associated with the PE includes a PE UUID identifying a PE location, a stripe offset within the PE, and a data buffer.

In a particular embodiment, the processing of each of the RAID I/O requests further includes identifying a node to receive the plurality of the RAID I/O requests, locating disk objects using a PE UUID comprising a Local Disk Manager (LDM) Universally Unique Identifier (UUID) and a disk UUID, generating a PE base sector offset by shifting the PE UUID by a predefined number of bits, adding the generated PE base sector offset to the PE stripe offset, issuing a read I/O request to the disk objects for a processing, and returning data to the identified node.

In one embodiment, Protection pool driver identifies the node to receive the plurality of the RAID I/O requests and write data. Protection pool driver issues a write I/O request to the disk objects for a processing. Protection pool driver returns an I/O completion status to the identified node.

In some embodiments, the data is provided to the file system once all of the plurality of the RAID I/O requests are processed.

In one embodiment, the I/O completion status is transmitted to the file system once all of the plurality of the RAID I/O requests are processed.

In some embodiments, the type of operation includes a read or write operation.

Using a protection pool strategy as described above, cluster capacity and performance can be expanded by adding additional nodes. This allows customers to buy smaller capacity nodes and scale the cluster incrementally as requirements change.

In another aspect of the disclosure, embodiments of the present disclosure also provide a non-transitory machine-readable medium and a data processing system perform the processes as described above.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of network such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fiber channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related component configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Protection pool architecture can be designed to work both in virtual and purpose-built backup appliance (PBBA) environments. In addition, the architecture may be extended to adapt easily to hyper converged solutions. The protection pool may be managed by a Physical Extent Manager (PEM) running on each node in the cluster. The PEM on each node may manage the AGRP running on the same node. When capacity is added, the PEM may request allocation of Physical Extents from the Local Disk Manager (LDM) on each node. The array ownership of a Physical Extent (PE) is determined by the LDM owning the disk and all its PEs. When there is a competition between two PEMs creating arrays and requesting the same PE, the LDM may determine which array is granted the PE. The array that is not granted the PE may fail the array creation process and the PEM may need to regenerate a new PE list and request the array create the process again.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly, there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 2:
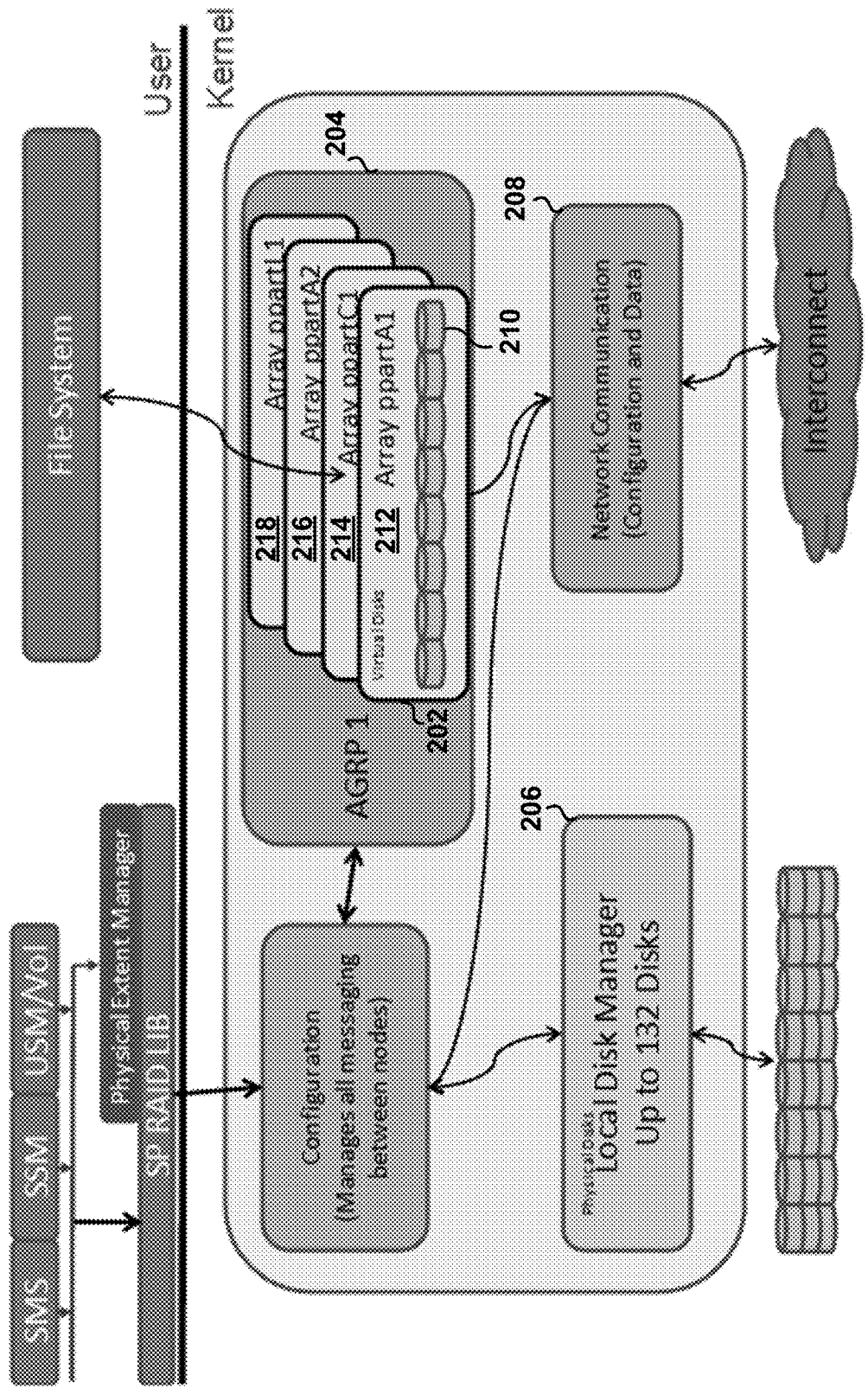
FIG. 2 is an illustration depicting an example of a protection pool driver according to one embodiment.

FIG. 2 is an example of a protection pool driver at one node according to one embodiment. In one embodiment, for example, the protection pool driver may be a Linux kernel module that may be based on the current DD RAID driver providing a stable code base. The main areas of change are in the areas of physical disk management and array management, network management and data transfer. The I/O graphing engine may remain unchanged. The current DD RAID driver manages arrays as part of a Disk Group which ties an array to a physical disk. The protection pool driver may separate the arrays from disk groups. As shown, array group (AGRP1) 204 may include a group of arrays (e.g., Array ppartA1 212, Array ppartC1 214, Array ppartA2 216, Array ppartL1 218). The group of arrays are then modified to use virtual disks 202 that may include a list of physical extents (PE) 210. In one embodiment, each of the PE may be designated with an address. Therefore, a virtual disk 202 may include a list of addresses that may point to a specific location on a physical disk 206 on a same or different node. The list of addresses may be represented by UUID. The PE 210 may be mapped to a physical disk 206 across the cluster. The disk I/O processing code may have a network component 208 added so when an I/O request is issued it may be redirected to the owning node/disk. Network component 208 may interconnect to other nodes in kernel driver layer. The receiving node may process the I/O request using the existing make disk request code. Once the I/O request is complete, the results may be returned to the requesting node.

A virtual disk 202 may include one or more PEs 210 that may represent a stripe unit index within an array. Virtual disk objects are contained in a virtual disk set and each virtual disk represents a stripe unit index in an array. Up to 24 PEs 210 can be assigned to each virtual disk 202. Each row of PEs 210 in the virtual disk 202 set may act like a small array within the parent array. The allocation of each row may follow the basic rule that each PE 210 in the row is allocated from a different physical disk 206.

In one embodiment, for example, Local Disk Manager (LDM) may manage the virtual disks 202 on a single node. LDM may divide each virtual disk 202 into PEs 210 and manage the allocation and ownership of these PEs 210. In another embodiment, the Array Group (AGRP) 204 may manage the arrays that makeup a collection of partitions. The AGRP 204 may manage the creation of arrays and generate a single UUID that can be used to manage all the arrays for reassembling process and migration to another node. The AGRP 204 includes a collection of arrays that belong to the same file system collection partition. Only one AGRP 204 may belong to the same collection partition. The AGRP 204 may be responsible for managing the creation, reconstruction, reassemble, disassemble, and destruction for all associated arrays. The AGRP 204 can be created on any node in the cluster and can migrate to any node in the cluster but can only be assembled on one node at a time. The AGRP 204 may have a unique ID that upper level processes can use to identify and manage the AGRP 204 and its arrays.

Figure 3:
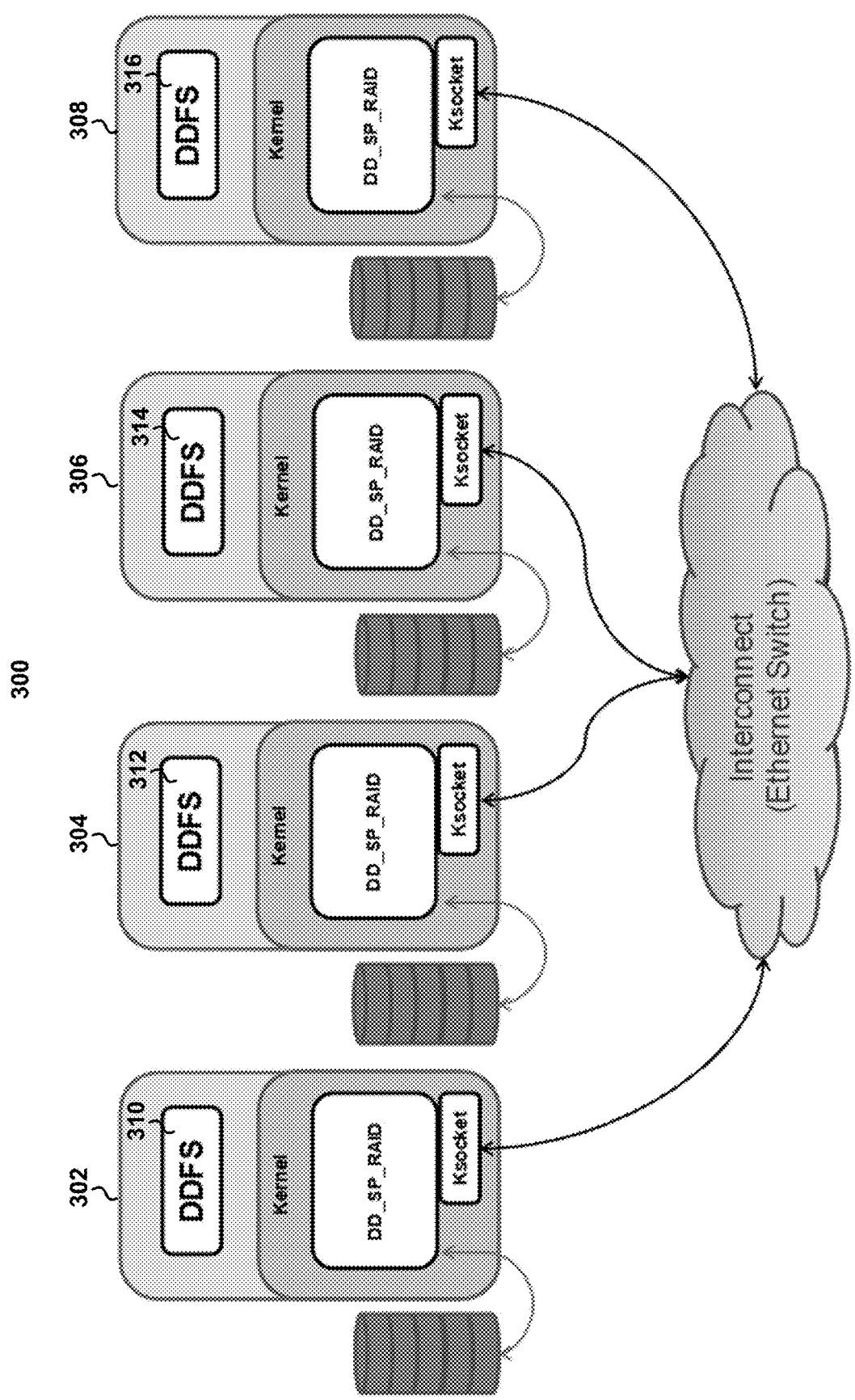
FIG. 3 is an illustration depicting an example of a network for handling the configuration and transfer of data between nodes according to one embodiment.

FIG. 3 is an example of a network module for configuring and transferring data between nodes in a multinode environment 300 according to one embodiment. As shown, the data for the four file systems (e.g., The Data Domain File System (DDFS) 310, 312, 314, and 316) are spread across the four nodes (e.g., 302, 304, 306, and 308). In one embodiment, the network traffic may use a TCP/IP for the communication between the nodes. Note that different communication protocols that are readily known to one skilled in the art may be used.

Figure 4:
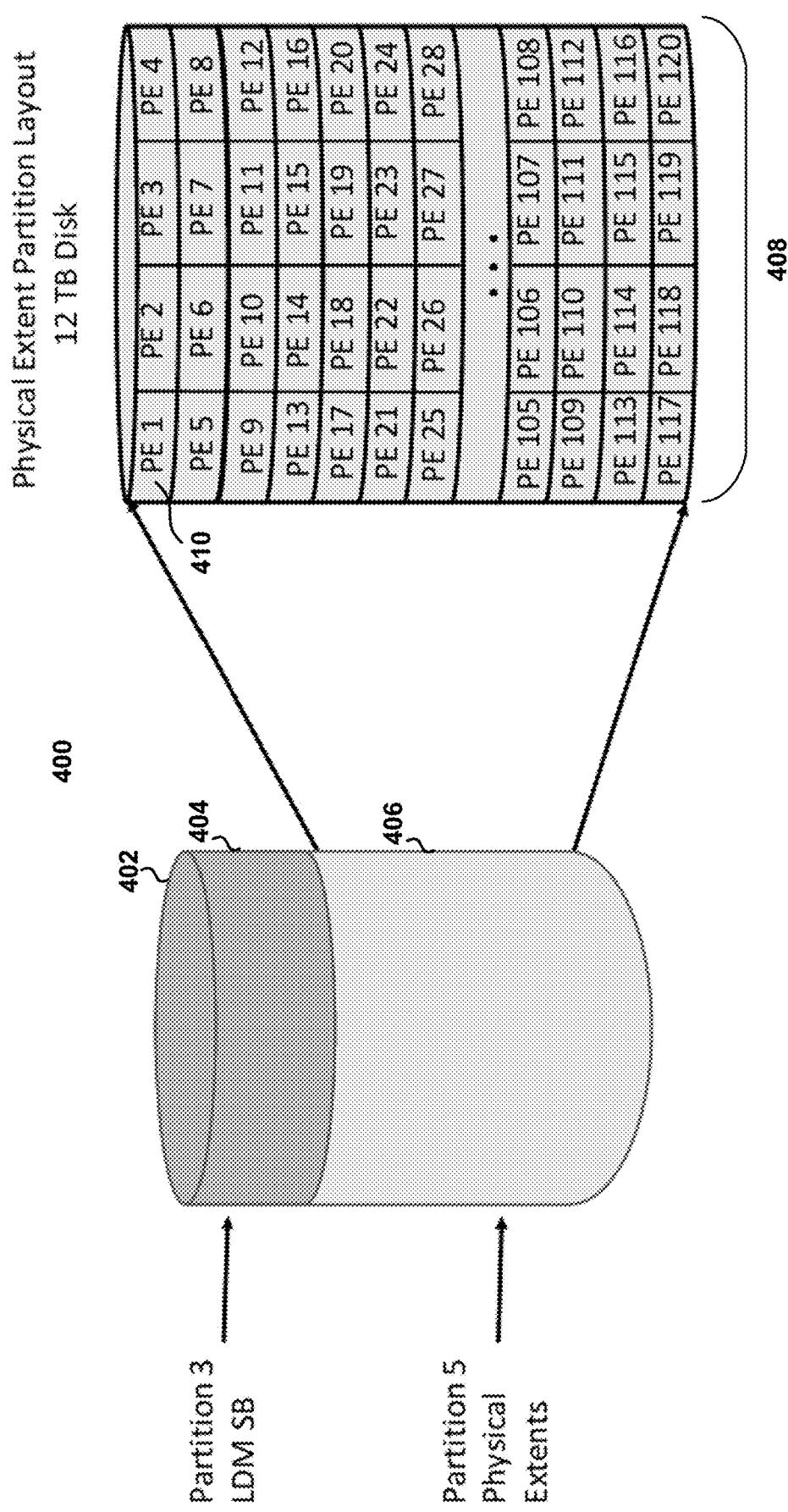
FIG. 4 is an illustration depicting an example of physical extent (PE) according to one embodiment.

FIG. 4 is an example of a physical extent (PE) partition layout 400 according to one embodiment. PEs 408 are the basic unit of a storage allocation in the protection pool. A PE 410 is a span of contiguous Logical block addressing (LBA) on a physical disk 402. The physical disk 402 may be divided into a number of PEs 408, wherein each PE 410 has an equal size. The size of a PE 410 may be the same for all PEs 408 across the cluster. The physical disk 402 may be divided into partition 3 404 and partition 5 406. Partition 3 may include metadata storing the mapping information between the PE 410 and the location on the physical disk 402. As shown in FIG. 4, a 12 Terabyte (TB) partition of a physical disk 402 may be divided into equally sized PEs 408. The PEs 408 may be contained within a partition on a disk. For example, as illustrated in FIG. 4, Partition 5 406 may include 120 PEs 408 (e.g., PE1, PE2, PE3, PE120). In this manner, keeping the PEs 408 within a partition 5 allows the disk to be used for multiple uses if needed. It may not be a requirement that all physical disks in the cluster have the same capacity. In one embodiment, all physical disks may have the same capacity for a PE allocation management. In some embodiments, for example, the PE size for a protection pool cluster may be 96 Gigabyte (GiB) for a virtual appliance and may be 186 GiB for a standalone PBBA.

Figure 5:
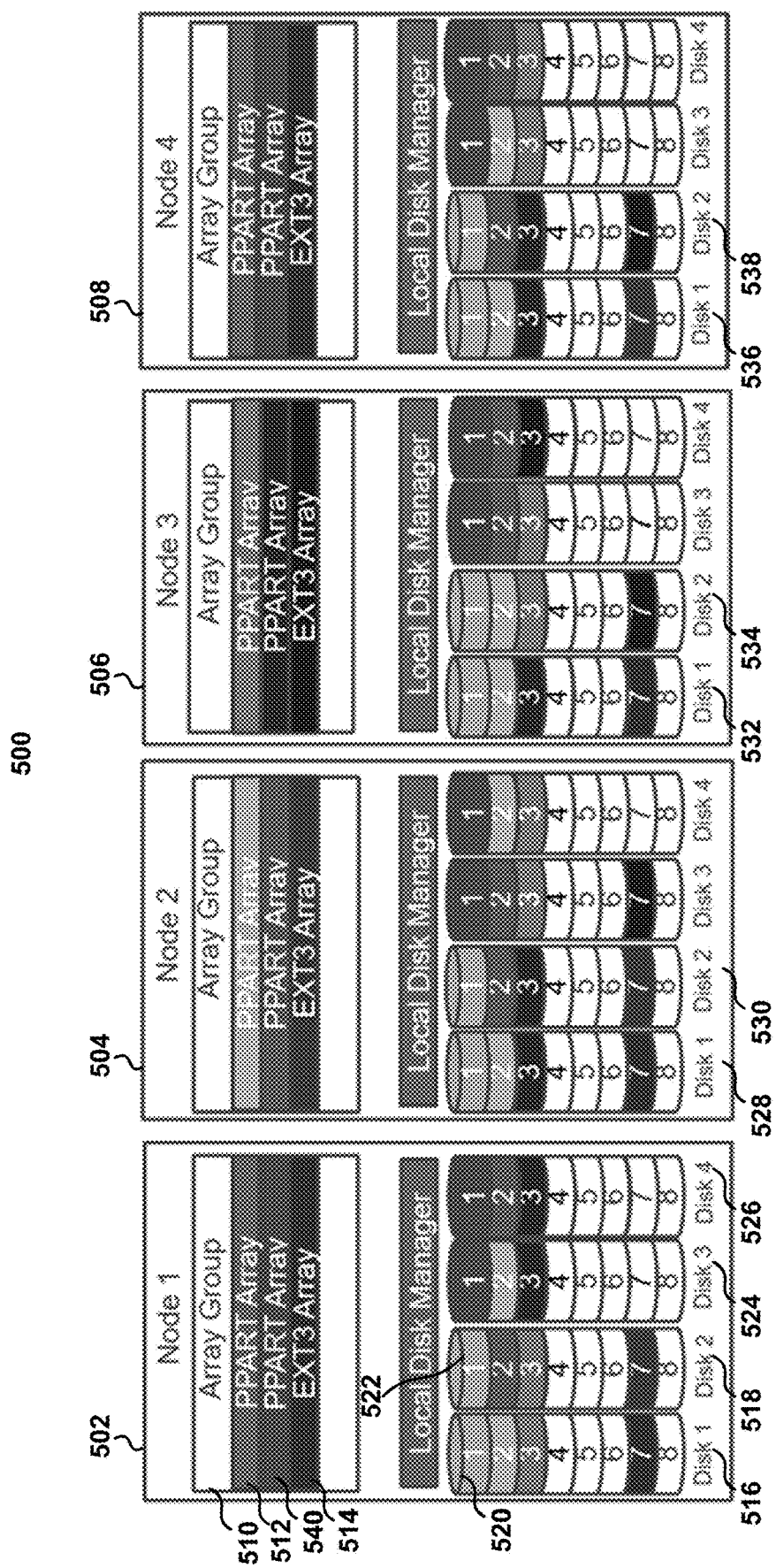
FIG. 5 is an illustration depicting an example of protection pool data layout according to one embodiment.

FIG. 5 illustrates an example of a PE layout for a cluster 500 in a multinode environment according to an embodiment. Referring to FIG. 5, the cluster 500, for example, may include a four-node cluster in which each node has an array group (e.g., 510) with two PPART 6+2 arrays 512, 540 (6 data drives and 2 parity drives) and one EXT3 3-way mirrored array 514. In one embodiment, the parity drives may include XOR and Reed Solomon parity drives.

As shown, each node may include four virtual disks (Disk1 516, Disk2 518, Disk3 524, Disk4 526). A virtual disk (e.g., Disk1 516) can support multiple PEs (e.g., 8 PEs). The number (1, 2, 3, 4, 5, 6, 7, 8) on each virtual disk represents PE number. As shown in FIG. 5, each virtual disks include a specific PE having a specific number. For example, Disk1 516, Disk2 518, Disk3 524, Disk4 526 can include PE #1. Two virtual disks (e.g., Disk1 516 and Disk2 518) on each node can include one PE (PE #1 520 and 522). Disk1 516, 528, 532, 536 and Disk2 518, 530, 534, 538 on nodes 502, 504, 506, 508, respectively, can include PE #1 associated with the data of PPART Array. Data associated with EXT3 Array can be distributed in PE #7 in Disk1 516, 528, 532 on nodes 502, 504, 506, respectively. In this manner, this PE layout 500 can support two failed physical disks or one failed node. Note that the number of PE within a virtual disk of the present disclosure is not limited to what is shown in the layout of FIG. 5.

As previously described, node 1 502 may include array group 510 having three arrays. Data associated with the first array of the array group 510 in node 1 502 are distributed to each node in the cluster 500. In this manner, data can be spread across multiple nodes.

A collection of physical extents (PE) that are grouped together can create an array. The PEs are grouped into virtual disks with up to 24 PEs per virtual disk. There is no restriction as to which physical disk or node the PE resides on, but the allocation of PEs on physical disks for an array may be managed so that PEs in one PE row are not allocated on the same physical disk.

PEs are managed by the Physical Extent Manager (PEM) and PE ownership is verified and approved by the owning LDM at array creation, array expansion or allocation of a spare PE. Arrays may be created for different uses and RAID levels. Some arrays may be created for use by only the local node used for Operating System (OS) and configuration data relevant to that node. When an array is created, the RAID level is assigned and there is no requirement that all the arrays have the same RAID level or the same number of PEs. All the RAID levels supported by the current DD RAID driver are supported in the protection pool driver.

The Protection pool driver uses a 128-bit UUID that is used to identify AGRPs, Arrays, LDMs, LDM Disks, and Physical Extents. The UUID layout allows mapping of Arrays to AGRPs or a PE offset to a disk, a LDM and a Node. Below table illustrates an example of the 128-bit UUID.

| Type | Bits 95-127 | Bits 64-95 | Bits 32-63 | Bits 0-31 |
|---|---|---|---|---|
| AGRP UUID | AGRP Magic Number | 32 bit AGRP UID | Reserved | Reserved |
| Array UUID | AGRP Magic Number | 32 bit AGRP UID | 32 bit Array UID | Reserved |
| LDM UUID | 32 bit Node UID | 32 bit LDM UID | Reserved | Reserved |
| LDM Disk UUID | 32 bit Node UID | 32 bit LDM UID | 32 bit disk UID | Reserved |
| PE UUID | 32 bit Node UID | 32 bit LDM UID | 32 bit Node UID | 32 bit PE Offset |

Each PE may be assigned a UUID (herein after "PE UUID") when an associated disk is added to an LDM. PE UUID may be used to identify the location of the extent. The PE UUID may include four 32-bit parts that may describe the location of each PE. In some embodiments, the PE UUID may include a NODE UUID, LDM UUID, DISK UUID, and the PEs physical LBA offset within the PE partition of the disk. One example of the PE UUID is shown below:

| | | Node | LDM | Disk | Extent | |
|---|---|---|---|---|---|---|
| Row: 1 | Vdisk: 0 | 0x11111111: | 0x620E0700: | 0xE1640700: | 0x00000008 | In Use |
| Row: 1 | Vdisk: 1 | 0x11111111: | 0x620E0700: | 0x4646F000: | 0x00000008 | In Use |
| Row: 1 | Vdisk: 2 | 0x22222222: | 0xA6D7FD00: | 0x5A46D400: | 0x00000008 | In Use |
| Row: 1 | Vdisk: 3 | 0x22222222: | 0xA6D7FD00: | 0xF479BA00: | 0x00000008 | In Use |
| Row: 1 | Vdisk: 4 | 0x33333333: | 0xFD5D6200: | 0xE3839B00: | 0x00000008 | In Use |
| Row: 1 | Vdisk: 5 | 0x33333333: | 0xFD5D6200: | 0x6BA23600: | 0x00000008 | In Use |
| Row: 1 | Vdisk: 6 | 0x44444444: | 0x7FB69600: | 0x62521800: | 0x00000008 | In Use |
| Row: 1 | Vdisk: 7 | 0x44444444: | 0x7FB69600: | 0x215B7500: | 0x00000008 | In Use |

The 128-bit AGRP UUID is used to keep all the arrays that make up a collection partition under one umbrella. The AGRP UUID may include a 32-bit magic number and a 32-bit AGRP UID. As arrays are created, the Array UUID is created by using the AGRP base UUID and adding the 32-bit Array UID. Keeping the Arrays under the AGRP UUID allows the AGRP and all its components to move to different nodes by only using the AGRP UUID.

The 128-bit LDM UUID is used for multiple purposes. It indicates which node owns the LDM, and which disks belong to the LDM. Also, it provides the PE location. When a LDM is created the base LDM UUID is made up of the node UID and the LDM UID. As each disk is added a disk UUID is created for each, it uses the LDM base UUID and adds the disk UID. When PE UUIDs are created the PE offset is shifted right 23 bits and that value becomes the PE UID. The PE UID is then added to the disks UUID to create a PE UUID for each PE.

When processing a I/O disk request from the file system, the array passes information associated with the PE. The information associated with the PE may include the PE UUID identifying a PE location, a stripe offset within the PE, and a data buffer.

As the I/O disk request is being processed, a node to receive the plurality of the RAID I/O requests can be identified. In one embodiment, the Node UID may be used to route the I/O disk request to the correct node. Once the I/O disk request is received by the node, disk objects can be located using a PE UUID including LDM UUID and a disk UUID. Therefore, the LDM UID can be used to identify which LDM contains that disk object. A PE base sector offset is generated by shifting the PE UUID by a predefined number of bits. For example, the LDM provides the disk object and the PE UUID offset is shifted left 22 bits to provide the PE base sector offset (starting offset). The generated PE base sector offset in the I/O request is then added to the PE stripe offset. Then, the local disk module processes the request. A read I/O request is issued to the disk objects for a processing. Once the disk request is complete, the results (e.g., the data) are returned to the identified node.

In another embodiment, the node to receive the plurality of the RAID I/O requests and write data can be identified. Then, a write I/O request can be issued to the disk objects for processing. Thereafter, a I/O completion status can be returned to the identified node.

In some embodiments, the data is provided to the file system once all of the plurality of the RAID I/O requests are processed.

In one embodiment, the I/O completion status is transmitted to the file system once all of the plurality of the RAID I/O requests are processed. The type of operation includes a read or write operation.

Figure 6:
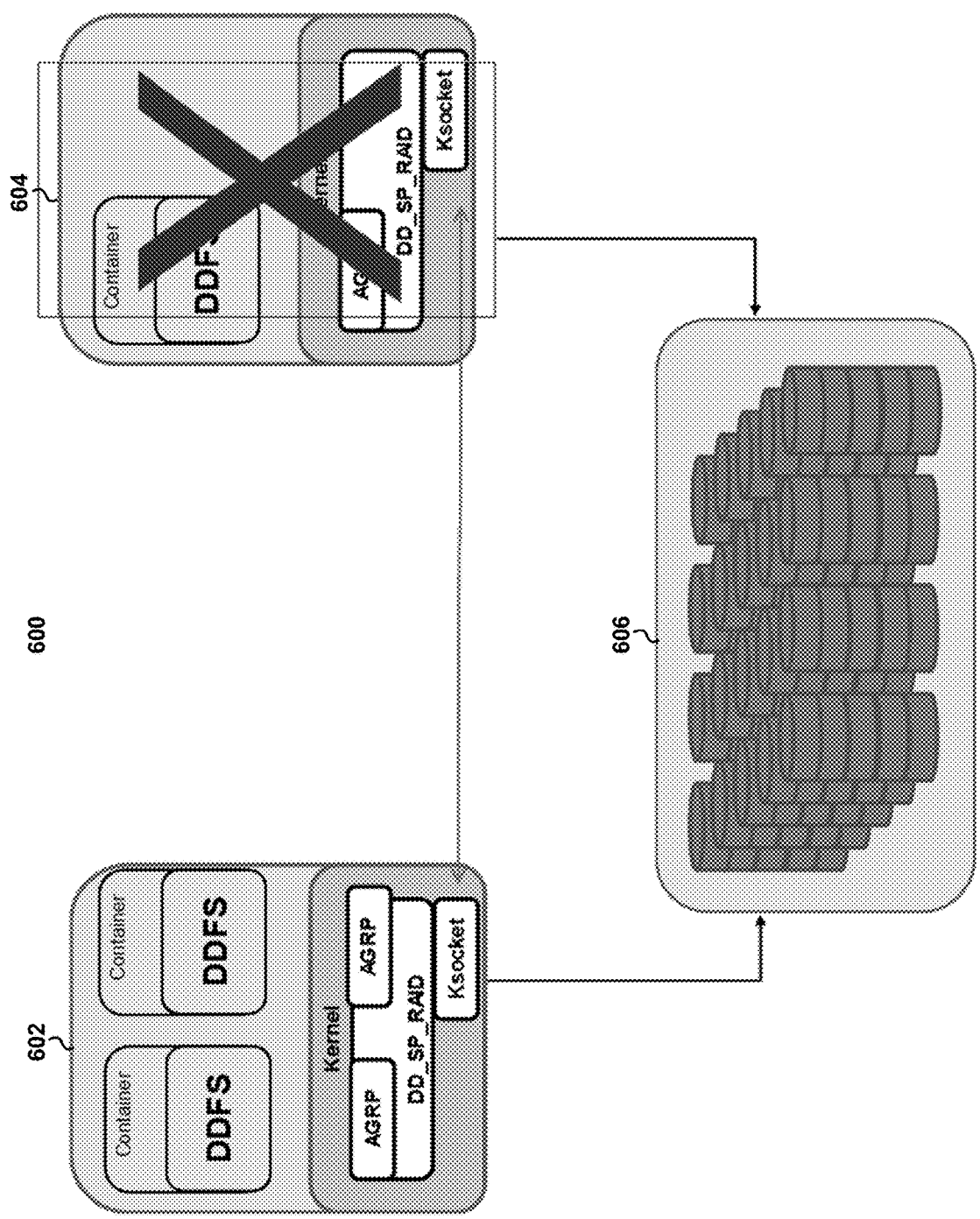
FIG. 6 is an illustration depicting an example of active/active storage pool according to one embodiment.

FIG. 6 illustrates an example of active/active storage pool 600 according to one embodiment. Referring to FIG. 6, file systems are running on two separate nodes (e.g., 602 and 604). Data 606 can still be accessed if either one of the nodes is down.

Figure 7:
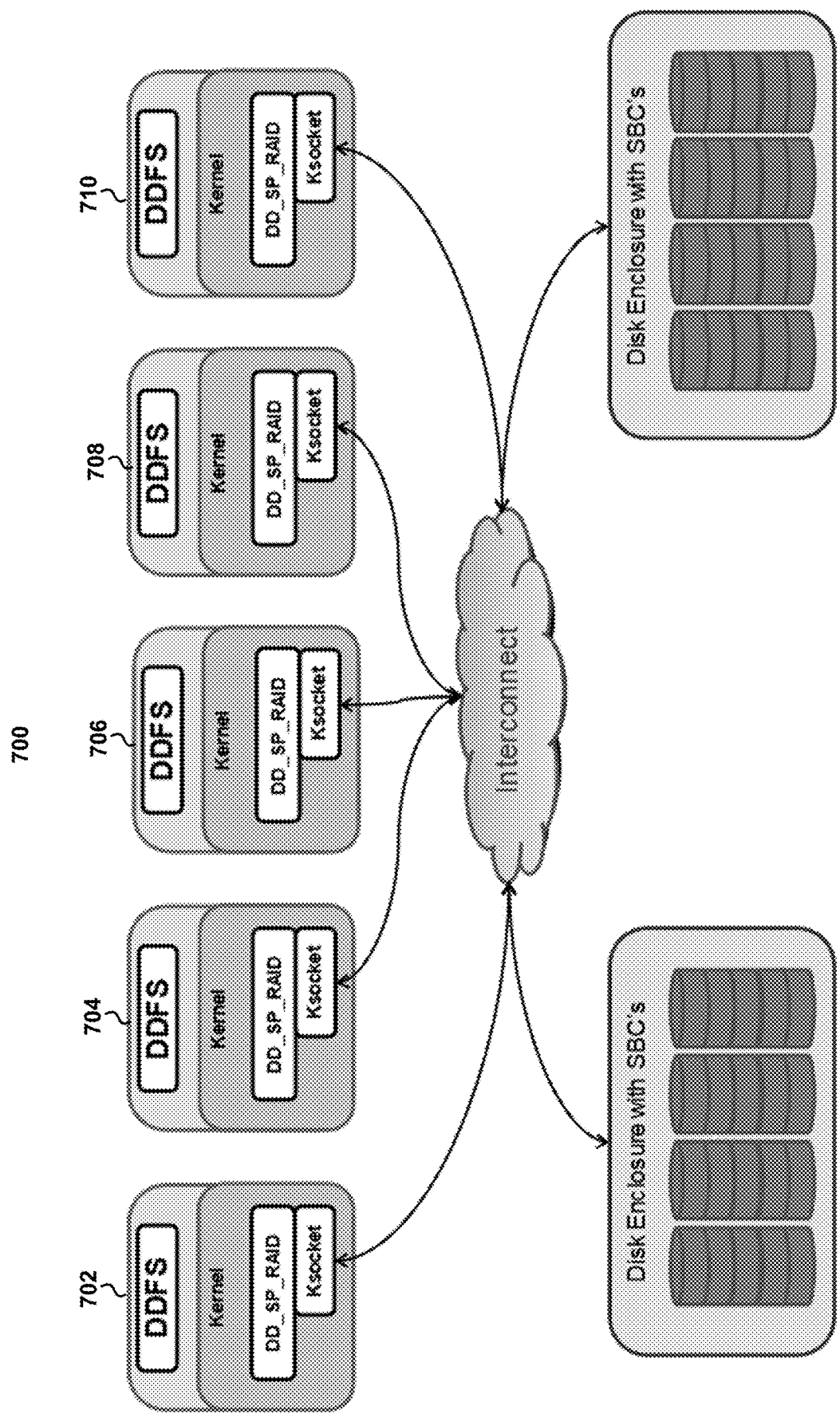
FIG. 7 is an illustration depicting an example of a storage pool configuration according to one embodiment.

FIG. 7 is an illustration depicting an example of a storage pool configuration 700 for multinode environment according to one embodiment. Disk Enclosures may run small Single Board Computers (SBC) running the RAID Driver. The LDM provides access to disks and AGRPs are running on each node (702, 704, 706, 708, 710). Tow SBCs can be run in each enclosure.

Figure 8:
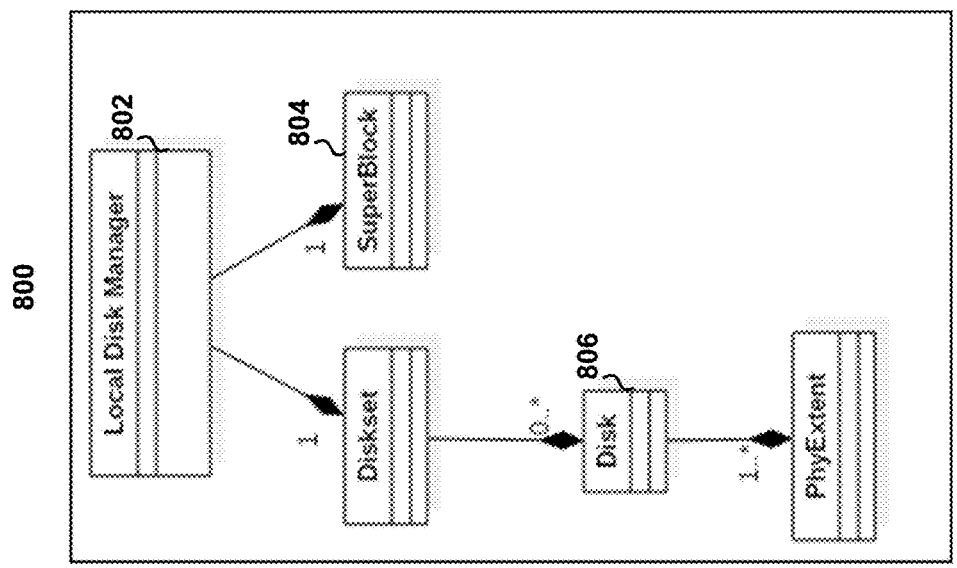
FIG. 8 is an illustration depicting an example of local disk manager (LDM) according to one embodiment.

FIG. 8 shows an example of Local Disk Manager (LDM) architecture 800 according to one embodiment. LDM 802 may replace Disk Group module. LDM 802 manages the physical disks on a node. LDM 802 may be responsible with an initial creation of a PE map, PE allocation, proactive disk error monitoring, disk failure management, maintaining the current state of disks and PEs, and managing LDM Meta data in SP RAID superblock 804. One or more LDMs 802 can be present on a single node. Having more than one LDM 802 may allow disks 806 to be grouped based on disk characteristics. A single LDM 802 can manage up to 132 disks (2 DS60 and one shelf of cache disks). The LDM 802 may manage allocation and current ownership of a devices PEs, as arrays are created the creation process may request allocation from all LDMs owning PEs. The LDM may allocate the PEs and store the current owner in LDMs superblock data. When the system is booted the LDM may provide the current state for all PEs to upper level processes. When disk(s) are added to an LDM each disk may have a performance group assigned. This may allow the Physical Extent Manager to allocate array in different performance tiers. The LDM may also monitor the physical disk error counters and notify the Physical Extent Manager (PEM) that a disk has exceeded an error threshold and needs to be replaced. When a write error occurs, the array may fail the PE and notify the LDM that the PE has failed. The LDM may fail the disk, notify each array that have PEs allocated on the failing disk, broadcast a message to PEMs on all nodes indicating a disk failed, all arrays that failed PEs may run in a degraded state until a replacement PE is issued from PEM, when the array received new PE(s) a reconstruction is started.

Figure 9:
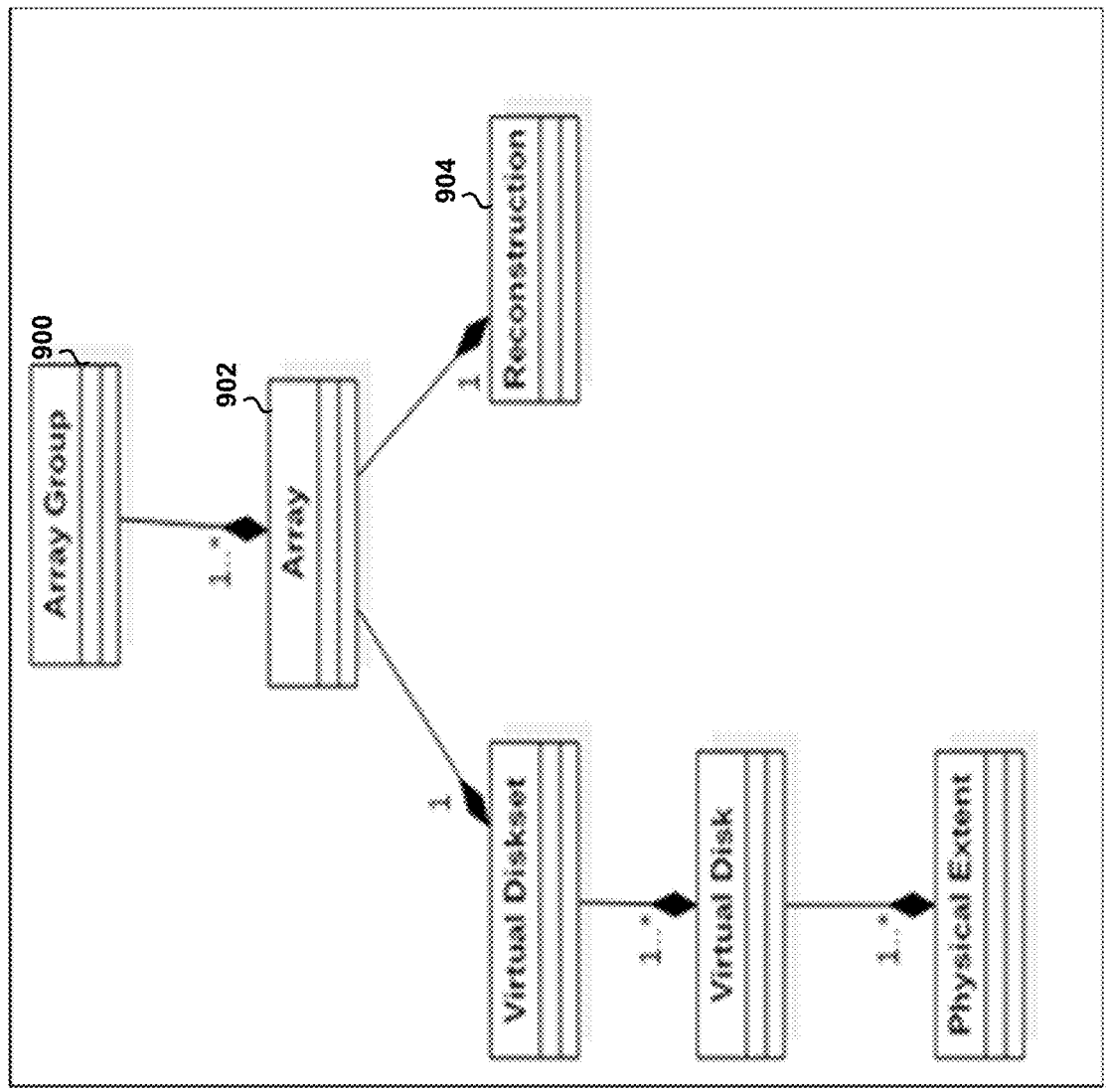
FIG. 9 is an illustration depicting an example of array group (AAGRP) according to one embodiment.

FIG. 9 shows an example of an Array Group (AGRP) 900 having a collection of arrays 902 that belong to the same file system collection partition according to one embodiment. In one embodiment, only one array group can belong to the same collection partition. The array group 900 may be configured for managing the creation, reconstruction 904, reassemble disassemble and destroying all associated arrays 902. The AGRP 900 can be created on any node in the cluster and can migrate to any node in the cluster but can only be assembled on one node at a time. The AGRP 900 may have a unique ID that upper level processes can use to identify and manage the AGRP and its arrays.

There are two types of reassembles: 1) LDM and 2) AGRP. When a node is booted the LDM may be reassembled when PEM module is started. This may allow all the nodes in the cluster to gather the necessary information to manage AGRP reassembles. The LDM provides AGRP reassembly data and state for all PEs managed by that LDM. The LDMs contain metadata information of all AGRPs. Once there are enough LDMs available the AGRP can be reassembled on their respective nodes. The ARGP reassemble is directed by a cluster manager through Volume and may instruct the nodes to reassemble specific AGRPs. AGRP reassemble all its associated arrays, during the array reassemble the state of its PEs are verified. The AGRP and its arrays can only be assembled on one node at a time but can be assembled on any node in the cluster.

Reconstructions 904 may be started for many reasons (e.g., user request fail disk, failed write on a PE, rebalancing, exceed error thresholds). The reconstruction 904 process may be managed by the PEM and performed on PE boundaries. Four types of reconstruction may be supported including full, copy, migrate and failback. The reconstruction of PEs from one physical disk may use spare PEs from multiple physical disks, because there are multiple PEs being reconstructed this allows simultaneous reconstructions. Having multiple concurrent reconstructions reduces the overall reconstruction time. When performing distributed sparing, it may cause rebalancing overhead once the failed disk is replaced. Once a disk is added to an LDM, PEM may start slowly migrating PEs to the newly added disk.

A file system collection partition contains elements from the active tier, cache tier and cloud tier, in the current DD RAID driver each tier is identified in the associated Disk Group. The protection pool driver no longer supports the concept of a Disk Group and the tier may be identified in each array in an AGRP.

Figure 10:
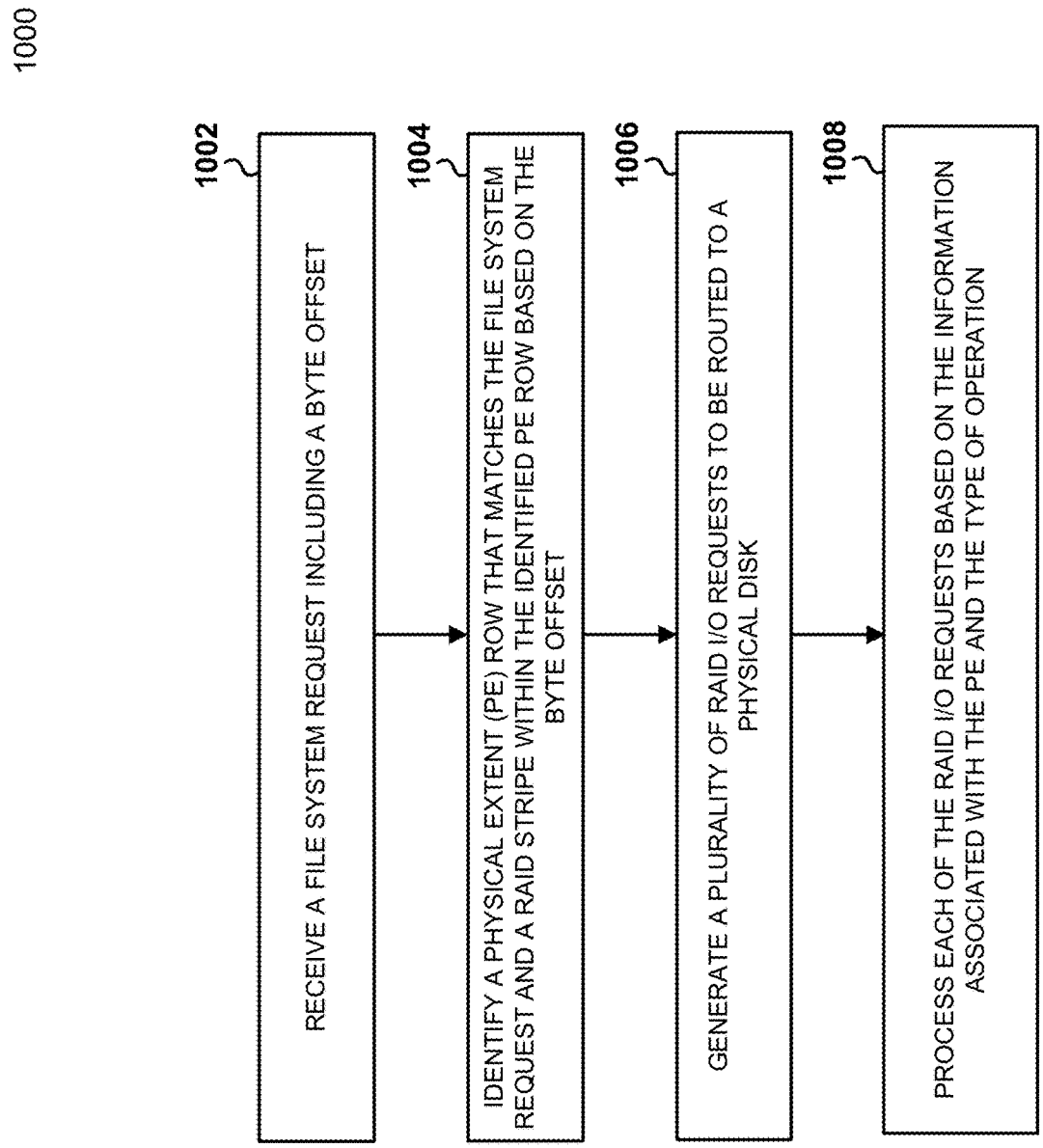
FIG. 10 is a flow diagram illustrating a method for processing Redundant Array of Independent Disks (RAID) Input/Output (I/O) requests for a plurality of nodes in a cluster according to one embodiment.

FIG. 10 is a flow diagram illustrating method 1000 for processing Redundant Array of Independent Disks (RAID) Input/Output (I/O) requests for a plurality of nodes in a cluster according to one embodiment. For example, method 1000 can be performed by Protection Pool driver, which can be implemented in software, firmware, hardware, or any combination thereof.

Referring now to FIG. 10, at block 1002, Protection Pool driver receives a file system request including a byte offset. In one embodiment, at block 1004, Protection Pool driver identifies a Physical Extent (PE) row that matches the file system request and a RAID stripe within the identified PE row based on the byte offset.

At block 1006, Protection Pool driver generates a plurality of RAID I/O requests to be routed to a physical disk. Each of the plurality of the RAID I/O requests may include information associated with the PE and a type of operation.

At block 1008, Protection Pool driver processes each of the RAID I/O requests based on the information associated with the PE and the type of operation.

Figure 11:
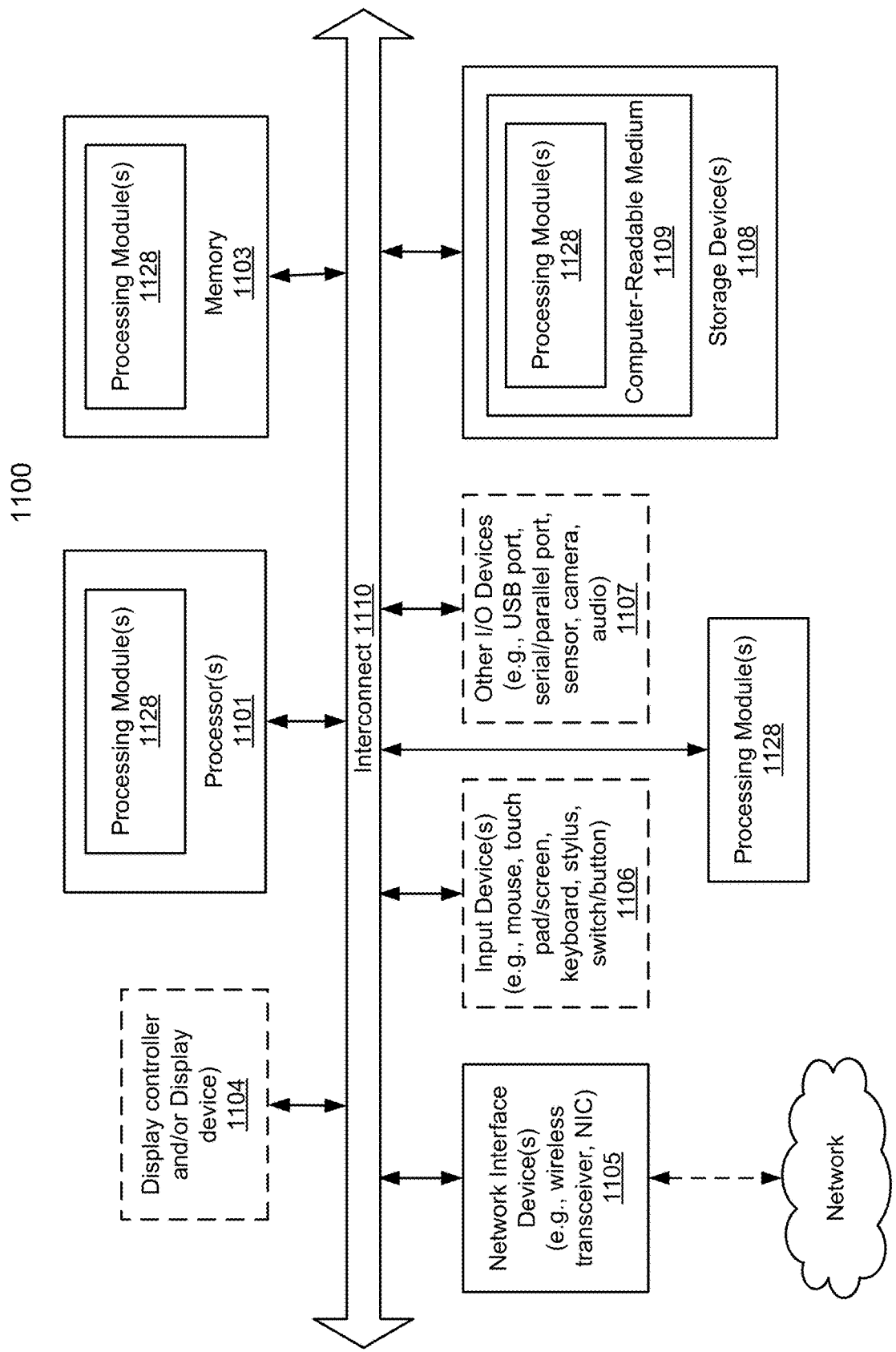
FIG. 11 is a block diagram illustrating a data processing system according to one embodiment.

Various embodiments and FIG. 11 is a block diagram illustrating an example of a data processing system which may be used with one embodiment of the invention. For example, system 1100 may represent any of data processing systems described above performing any of the processes or methods described above. System 1100 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1100 is intended to show a high level view of many components of the computer system. However, it is to be understood that additional components may be present in certain implementations and furthermore, different arrangement of the components shown may occur in other implementations. System 1100 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1100 includes processor 1101, memory 1103, and devices 1105-1108 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1101, which may be a low power multi-core processor socket such as an ultra-low voltage processor, may act as a main processing unit and central hub for communication with the various components of the system. Such processor can be implemented as a system on chip (SoC). Processor 1101 is configured to execute instructions for performing the operations and steps discussed herein. System 1100 may further include a graphics interface that communicates with optional graphics subsystem 1104, which may include a display controller, a graphics processor, and/or a display device.

Processor 1101 may communicate with memory 1103, which in one embodiment can be implemented via multiple memory devices to provide a given amount of system memory. Memory 1103 may include one or more volatile storage (or memory) devices such as random access memory (RAM), dynamic RAM (DRAM), synchronous DRAM (SDRAM), static RAM (SRAM), or other types of storage devices. Memory 1103 may store information including sequences of instructions that are executed by processor 1101, or any other device. For example, executable code and/or data of a variety of operating systems, device drivers, firmware (e.g., input output basic system or BIOS), and/or applications can be loaded in memory 1103 and executed by processor 1101. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1100 may further include IO devices such as devices 1105-1108, including network interface device(s) 1105, optional input device(s) 1106, and other optional IO device(s) 1107. Network interface device 1105 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1106 may include a mouse, a touch pad, a touch sensitive screen (which may be integrated with display device 1104), a pointer device such as a stylus, and/or a keyboard (e.g., physical keyboard or a virtual keyboard displayed as part of a touch sensitive screen). For example, input device 1106 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1107 may include an audio device. An audio device may include a speaker and/or a microphone to facilitate voice-enabled functions, such as voice recognition, voice replication, digital recording, and/or telephony functions. Other IO devices 1107 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1107 may further include an imaging processing subsystem (e.g., a camera), which may include an optical sensor, such as a charged coupled device (CCD) or a complementary metal-oxide semiconductor (CMOS) and/or an optical sensor, utilized to facilitate camera functions, such as recording photographs and video clips. Certain sensors may be coupled to interconnect 1110 via a sensor hub (not shown), while other devices such as a keyboard or thermal sensor may be controlled by an embedded controller (not shown), dependent upon the specific configuration or design of system 1100.

To provide for persistent storage of information such as data, applications, one or more operating systems and so forth, a mass storage (not shown) may also couple to processor 1101. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1101, e.g., via a serial peripheral interface (SPI). This flash device may provide for non-volatile storage of system software, including a basic input/output software (BIOS) as well as other firmware of the system.

Storage device 1108 may include computer-accessible storage medium 1109 (also known as a machine-readable storage medium or a computer-readable medium) on which is stored one or more sets of instructions or software (e.g., processing module, unit, and/or logic 1109) embodying any one or more of the methodologies or functions described herein. Processing module/unit/logic 1109 may represent any of the components described above, such as, for example, backup server 106, backup application 108, redundancy analyzer 110, backup logic 121, restore logic 123, garbage collector 112, cloud computing service 122, or API 124 as described above. Processing module/unit/logic 1109 may also reside, completely or at least partially, within memory 1103 and/or within processor 1101 during execution thereof by data processing system 1100, memory 1103 and processor 1101 also constituting machine-accessible storage media. Processing module/unit/logic 1109 may further be transmitted or received over a network via network interface device 1105.

Computer-readable storage medium 1109 may also be used to store some of the software functionalities described above persistently. While computer-readable storage medium 1109 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1109, components and other features described herein can be implemented as discrete hardware components or integrated in the functionality of hardware components such as ASICS, FPGAs, DSPs or similar devices. In addition, processing module/unit/logic 1109 can be implemented as firmware or functional circuitry within hardware devices. Further, processing module/unit/logic 1109 can be implemented in any combination hardware devices and software components.

Note that while system 1100 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which may have fewer or more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods described above are in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing Redundant Array of Independent Disks (RAID) Input/Output (I/O) requests for a plurality of nodes in a cluster, comprising:
    receiving a file system request including a byte offset;
    identifying a Physical Extent (PE) row that matches the file system request and a RAID stripe within the identified PE row based on the byte offset;
    generating a plurality of RAID I/O requests to be routed to a physical disk, wherein each of the plurality of the RAID I/O requests comprises information associated with the PE and a type of operation; and
    processing each of the RAID I/O requests based on the information associated with the PE and the type of operation, comprising:
        identifying a node to receive the plurality of the RAID I/O requests;
        locating disk objects using a PE universally unique identifier (UUID) comprising a Local Disk Manager (LDM) UUID and a disk UUID;
        generating a PE base sector offset by shifting the PE UUID by a predefined number of bits;
        issuing a read I/O request to the disk objects based on the PE base sector offset for a processing; and
        returning data to the identified node.

2. The method of claim 1, wherein the information associated with the PE comprises a PE UUID identifying a PE location, a stripe offset within the PE, and a data buffer.

3. The method of claim 1, wherein the processing of each of the RAID I/O requests further comprises:
    adding the generated PE base sector offset to the PE stripe offset.

4. The method of claim 3 further comprising:
    identifying the node to receive the plurality of the RAID I/O requests and write data;
    issuing a write I/O request to the disk objects for a processing; and
    returning an I/O completion status to the identified node.

5. The method of claim 3, wherein the data is provided to the file system once all of the plurality of the RAID I/O requests are processed.

6. The method of claim 4, wherein the I/O completion status is transmitted to the file system once all of the plurality of the RAID I/O requests are processed.

7. The method of claim 1, wherein the type of operation comprises a read or write operation.

8. A non-transitory machine-readable medium having instructions stored therein, which when executed by a processor, cause the processor to perform operations of processing Redundant Array of Independent Disks (RAID) Input/Output (I/O) requests for a plurality of nodes in a cluster, the operations comprising:
    receiving a file system request including a byte offset;
    identifying a Physical Extent (PE) row that matches the file system request and a RAID stripe within the identified PE row based on the byte offset;
    generating a plurality of RAID I/O requests to be routed to a physical disk, wherein each of the plurality of the RAID I/O requests comprises information associated with the PE and a type of operation; and
    processing each of the RAID I/O requests based on the information associated with the PE and the type of operation, comprising:
        identifying a node to receive the plurality of the RAID I/O requests;
        locating disk objects using a PE universally unique identifier (UUID) comprising a Local Disk Manager (LDM) UUID and a disk UUID;
        generating a PE base sector offset by shifting the PE UUID by a predefined number of bits;
        issuing a read I/O request to the disk objects based on the PE base sector offset for a processing; and
        returning data to the identified node.

9. The machine-readable medium of claim 8, wherein the information associated with the PE comprises a PE UUID identifying a PE location, a stripe offset within the PE, and a data buffer.

10. The machine-readable medium of claim 8, wherein the processing of each of the RAID I/O requests further comprises:
    adding the generated PE base sector offset to the PE stripe offset.

11. The machine-readable medium of claim 10, wherein the operations further comprise:
    identifying the node to receive the plurality of the RAID I/O requests and write data;
    issuing a write I/O request to the disk objects for a processing; and
    returning an I/O completion status to the identified node.

12. The machine-readable medium of claim 10, wherein the data is provided to the file system once all of the plurality of the RAID I/O requests are processed.

13. The machine-readable medium of claim 11, wherein the I/O completion status is transmitted to the file system once all of the plurality of the RAID I/O requests are processed.

14. The machine-readable medium of claim 8, wherein the type of operation comprises a read or write operation.

15. A data processing system, comprising:
    a processor; and
    a memory to store instructions, which when executed by the processor, cause the processor to perform operations of processing Redundant Array of Independent Disks (RAID) Input/Output (I/O) requests for a plurality of nodes in a cluster, the operations including:
    receiving a file system request including a byte offset;
    identifying a Physical Extent (PE) row that matches the file system request and a RAID stripe within the identified PE row based on the byte offset;
    generating a plurality of RAID I/O requests to be routed to a physical disk, wherein each of the plurality of the RAID I/O requests comprises information associated with the PE and a type of operation; and
    processing each of the RAID I/O requests based on the information associated with the PE and the type of operation, comprising:

identifying a node to receive the plurality of the RAID I/O requests;

locating disk objects using a PE universally unique identifier (UUID) comprising a Local Disk Manager (LDM) UUID and a disk UUID;

generating a PE base sector offset by shifting the PE UUID by a predefined number of bits;

issuing a read I/O request to the disk objects based on the PE base sector offset for a processing; and returning data to the identified node.

16. The data processing system of claim 15, wherein the information associated with the PE comprises a PE UUID identifying a PE location, a stripe offset within the PE, and a data buffer.

17. The data processing system of claim 15, wherein the processing of each of the RAID I/O requests further comprises:

adding the generated PE base sector offset to the PE stripe offset.

18. The data processing system of claim 17, wherein the operations further comprise:

identifying the node to receive the plurality of the RAID I/O requests and write data;

issuing a write I/O request to the disk objects for a processing; and returning an I/O completion status to the identified node.

19. The data processing system of claim 17, wherein the data is provided to the file system once all of the plurality of the RAID I/O requests are processed.

20. The data processing system of claim 18, wherein the I/O completion status is transmitted to the file system once all of the plurality of the RAID I/O requests are processed.

* * * * *